United States Patent Office 2,839,077
Patented June 17, 1958

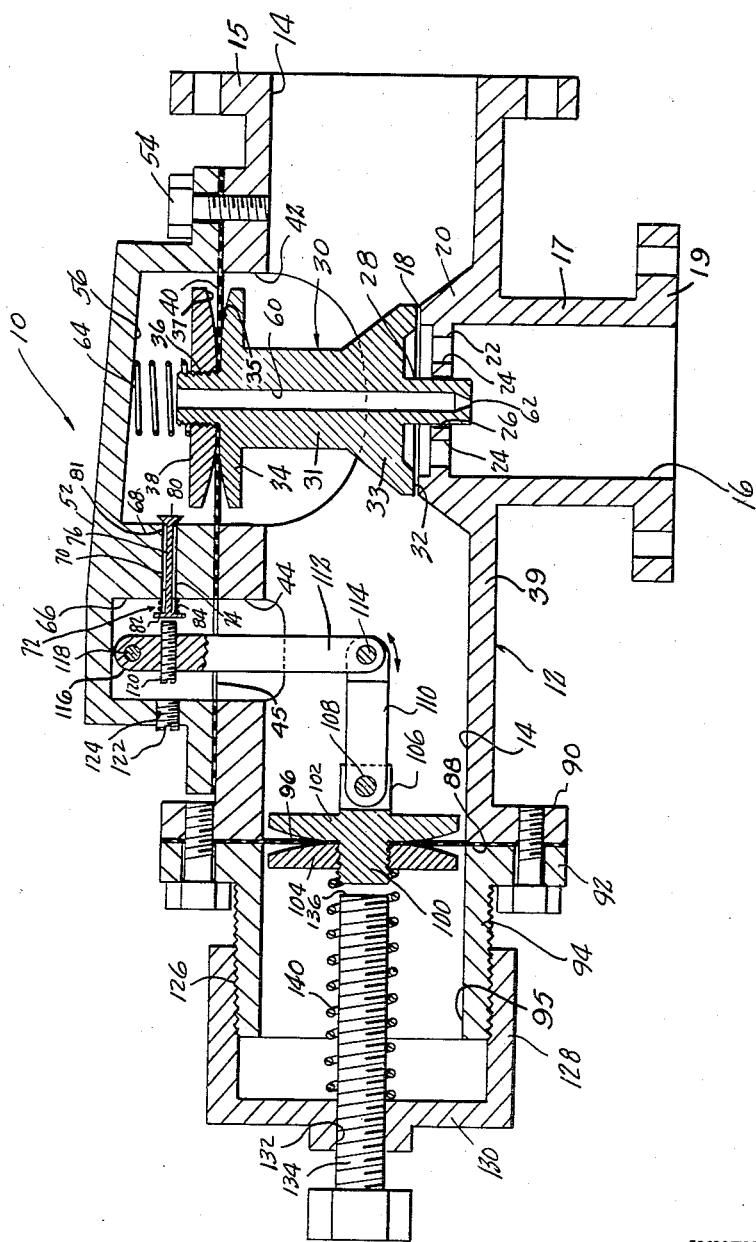

2,839,077

PRESSURE REGULATOR ASSEMBLY

Alv B. Kristensson, Hedvigsdal, Sweden

Application September 28, 1956, Serial No. 612,755

1 Claim. (Cl. 137—491)

This invention relates generally to an improved pressure responsive pressure regulator assembly for maintaining predetermined substantially constant pressure in a fluid system.

Various types of pressure regulator assemblies have been heretofore proposed which although maintaining a substantially constant pressure, are relatively noisy in operation, and have "hunting" characteristics which are undesirable and generally not conducive to efficient operation.

The primary object of the invention is to provide a more efficient, reliable, and quieter device of this kind, which is relatively simple in construction, and has simple and uncomplicated components which can be easily serviced and/or replaced, and which is compact in form.

Another object of the invention is to provide a fluid pressure regulator assembly of the character indicated which can be made in rugged and serviceable forms at relatively low cost, is easily adjusted and maintained, and is highly satisfactory and practical for the purposes intended.

These together with other objects and advantages which will become apparent reside in the details of construction and operation as more fully hereinafter described and claimed, reference being had to the accompanying drawings forming a part hereof, wherein like numerals refer to like parts throughout the several views, and in which:

The drawing is a longitudinal section of a fluid pressure regulator assembly in accordance with the present invention, the parts thereof being shown in the positions they occupy when the fluid pressure at the outlet of the assembly is higher than that which is to be maintained in a fluid system.

Referring to the drawings in detail, the illustrated fluid pressure regulator assembly, indicated generally at 10, comprises an elongated casing 12 having therein a longitudinally extending bore 14, and having a flange 15 on its open end for connecting the bore 14 in communication with a fluid system, including such as a pressure tank (not shown) which is to be maintained at a predetermined constant pressure. Projecting laterally from one side of the casing 12 is an arm 17 having a flange 19 on its outer end, and having an inlet bore 16 adapted to be connected in communication with a source of fluid under pressure.

The inward end of the bore 16 of the inlet arm 17 is partially closed by an annular machined seat 18 constituted by the end surface of a raised boss 20 extending into the main bore 14 of the casing 12. The boss 20 includes a wall 22 extending across the bore 16 having openings 24 enabling restricted passage of fluid under pressure therethrough. The boss has a central opening 26 reciprocably receiving therethrough a tubular terminal 28 on the adjacent end of a valve 30 which extends across the main bore 14 in alignment with the longitudinal axis of the inlet bore 16.

The valve 30 comprises a substantially hour-glass shaped preferably solid body 31 having an enlarged end portion 33 having a machined end 32 of the same diameter as and engaged with the machined valve seat 18 for closing communication between the bores 16 and 14. The valve body 31 has on its other end an enlarged head 34 which has thereon a reduced diameter externally threaded tubular stud 36 into which is threaded a clamping nut 38 of the same diameter as the head 34. The head 34 and the nut 38 have convex facing sides 35 and 37 which engage related sides of a flexible diaphragm 40.

The side wall 39 of the casing 12 opposite the arm 17 has therein an opening 42 through which the head 34 of the valve 30 extends, and across which the flexible diaphragm 40 extends. In line with and spaced longitudinally inwardly from the opening 42 is another opening 44, over which a portion of the diaphragm 40 extends, and this portion of the diaphragm an opening 45 registered with the opening 44.

An elongated housing 52 is secured to the outer side of the casing 12, as by screws 54, and overlies the openings 42 and 44, and has therein a chamber 56 into which the nut 38 on the valve 30 extends, and a smaller chamber 66 separated from the chamber 56 by a partition wall 68.

Extending axially through the valve 30 is a bore 60 having a related end communicating with the chamber 56 and having another end opening through the terminal 28 and restricted at 29 to define a metering port 62 in communication with the inlet bore 16 of the inlet arm 17.

A coil spring 64 is compressed between the retaining nut 48 and and inner surface of the chamber 56 and biases the end 32 of the valve 32 toward engagement with the inlet valve seat 18.

The wall 68 between the chambers 56 and 66 has extending therethrough a longitudinal bore 70 having reciprocably disposed therein a valve 72. The valve 72 comprises a sleeve 74 extending through the bore 70 and having therein an endwise movable stem 76. The stem 76 has on one end a tapered valve element 80 disposed within the chamber 56 and engageable with a valve seat 81 on the adjacent end of the sleeve 74. The end of the stem 76 disposed within the chamber 56 has thereon an enlarged head 82, and a coil spring 84, circumposed on the sleeve, is compressed between the head 82 and the wall 68 and engages the valve element 80 with the seat 81.

The inner end 15 of the casing 12 is to be connected to a system in which a constant pressure is to be maintained. The outer end 88 of the casing 12 has thereon a flange 90 secured to a similar flange 92 on the adjacent end of a tubular nipple 94 having a bore 95 aligned with the main casing bore 14. Secured between the flanges 90 and 92 and extending across the bore 14 is a flexible diaphragm 96. Threaded on the outer end of and closing the nipple 94 is a cap 130 having a side wall 128 and an end wall 130.

An enlarged head 102 bears against the inner side of the diaphragm 96 and has a boss 100 traversing the diaphragm, on which is threaded an enlarged nut 104 which bears against the outer side of the diaphragm.

A bifurcated axial lug 106 on the inner side of the head 102 is traversed by a pivot 108 which connects thereto one end of a normally horizontal or axial link 110, whose other end is pivoted at 114 on the lower or inner end of a transverse lever 112. The lever 112 has an outer end portion 116 located within the chamber 66 and pivoted therein on a pivot 118 extending across the chamber 66. Extending through the end portion 116 of the lever 112 in axial alignment with the head 82 of the valve 72, is an adjustable screw 120 which may be adjusted toward and away from the head 82 by inserting a tool through an access opening 124 in the housing 52, normally closed by a screw 122. Pivoting of the lever 112 in opposite directions produces seating and unseating of the valve element 80 of the valve 72, so as to control communication between the chamber 56 and the chamber 66 and the main bore 14.

An axial shaft 134 is threaded through the cap end wall 130, as indicated at 132, and has an inner end 136 normally spaced from the boss 100 on the diaphragm head 102. Circumposed on the shaft 134 and compressed between the cap end wall 130 and the nut 104 is a coil spring 140, the tension of the spring 140 being adjustable by rotation of the cap 128.

Normally the cap 128 is adjusted to apply a predetermined pressure on the diaphragm 96, which, in the absence of pressure in the outlet end of the bore 14, causes opening of the valve 72 which balances the pressures in the chamber 56 and in the bore 14. When this balanced condition obtains, a higher pressure in the inlet bore 16 is effective to move the valve 30 off its seat 18 and enter the main bore 14. When sufficient pressure in the bore 14 develops to overcome the resistance of the spring 140, the diaphragm 96 is moved toward the left, as seen in the drawing, and the abutment screw 120 on the lever 112 is disengaged from the valve head 82 and permits the valve 72 to open, whereat the spring 64 in the chamber 56 becomes effective to urge the valve 30 toward its seat 18 and closes off further inlet of pressure through the arm 17 from a source of fluid under pressure.

When pressure in the main bore 14 drops below a predetermined level, the diaphragm 96 is moved by the spring 140 toward the right, as seen in the drawing, so as to open the valve 72 and provide communication between the chamber 56 and the main bore 14, through the chamber 66. This reduces pressure in the chamber 56 and permits the valve 30 to move away from its valve seat 18, and remain unseated until pressure in the main bore 14 and in the inlet bore 16 become sufficient to overcome the resistance of the spring 140.

The foregoing is considered as illustrative only of the principles of the invention. Since numerous modifications and changes will readily occur to those skilled in the art, it is not desired to limit the invention to the exact construction and operation shown and described, and accordingly all suitable modifications and equivalents may be resorted to, as fall within the scope of the appended claim.

What is claimed as new is as follows:

In a pressure responsive constant fluid pressure regulator, an elongated casing having a main axial bore and having inner outlet end and an outer end and a side wall, a lateral inlet arm on said side wall having an inlet bore communicating with said main bore, said inner end of the casing being adapted to be connected to a fluid system to be regulated and said arm being adapted to be connected to a source of fluid pressure, said casing side wall having a first opening opposite said inlet arm and a second opening located between said first opening and the outer end of the casing, a first flexible diaphragm extending across said first opening, a main valve extending across said main bore and having a head on one end engaging the adjacent side of said diaphragm and secured thereto, an annular face on the other end of said valve, a boss on the casing side wall at and closing said inlet bore, said boss having an annular valve seat facing said annular face and a perforated wall providing restricted communication between said inlet bore and said main bore only while said face is unseated from said seat, said valve having an axial bore extending therethrough having a restricted end opening into said inlet bore, a housing secured to the outer side of the valve casing side wall over said first and second openings, said housing having a first chamber registered with said first opening and freely receiving the head of said main valve, a spring compressed between a portion in said first chamber and said head and urging said first valve toward its seat, said housing having a second chamber registered with said second opening, a partition wall separating said first and second chambers, a longitudinal bore extending through said partition wall and communicating with said first and second chambers and through said second chamber with said main bore, a spring urged valve in said longitudinal bore including a seat in said first chamber and a stem having a valve element in said second chamber, a lever extending across said main bore having an outer end portion pivoted in said second chamber and an inner end, an abutment element on said outer end portion of said lever for engagement with the head on said stem for moving the stem in a direction to unseat said valve element, a second flexible diaphragm secured across the outer end of said casing, a diaphragm head engaged with the inner side of said second diaphragm, means articulating said diaphragm head to the inner end of said lever, a longitudinally adjustable cap mounted on the outer end of the casing, an axial shaft threaded through said cap and having an inner end close to and normally spaced from said second diaphragm, and a coil spring circumposed on said shaft and compressed between said cap and said second diaphragm.

References Cited in the file of this patent

UNITED STATES PATENTS

| | | |
|---|---|---|
| 474,244 | Hanson | May 3, 1892 |
| 479,234 | Webb | July 19, 1892 |
| 802,496 | Collin | Oct. 24, 1905 |
| 2,051,350 | Smith | Aug. 18, 1936 |
| 2,627,866 | Holmes | Feb. 10, 1953 |